US010465346B2

(12) United States Patent
Hoffmann et al.

(10) Patent No.: US 10,465,346 B2
(45) Date of Patent: Nov. 5, 2019

(54) METHOD FOR POSITIONING A GROUND MILLING MACHINE RELATIVE TO THE GROUND, AND GROUND MILLING MACHINE

(71) Applicant: BOMAG GmbH, Boppard (DE)

(72) Inventors: Andre Hoffmann, Gondershausen (DE); Jens-Martin Zehbe, Schoeningen (DE); Marco Reuter, Emmelshausen (DE); Andreas Nacke, Dessighofen (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 15/628,848

(22) Filed: Jun. 21, 2017

(65) Prior Publication Data
US 2017/0362784 A1 Dec. 21, 2017

(30) Foreign Application Priority Data

Jun. 21, 2016 (DE) .................. 10 2016 007 596

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *B60G 3/01* (2013.01);
(Continued)

(58) Field of Classification Search
CPC .......... E21C 27/24; E21C 35/24; E21C 35/08; E21C 35/18; E21C 35/00; E21C 25/10; E21C 25/06; E21C 35/68; E21C 41/00; E01C 23/088; E01C 2301/00; E01C 23/127; G01F 17/00; G01B 21/08; G01B 5/18;
(Continued)

(56) References Cited

U.S. PATENT DOCUMENTS 8,944,517 B2 * 2/2015 Franzmann ........... E01C 23/127
299/1.5
2013/0162003 A1 * 6/2013 Killion .................. E01C 23/088
299/1.5
(Continued)

FOREIGN PATENT DOCUMENTS

DE 102006062129 A1 7/2008
DE 112012005425 T5 9/2014
DE 102013010298 A1 12/2014

*Primary Examiner* — Sunil Singh
(74) *Attorney, Agent, or Firm* — Wood Herron & Evans LLP

(57) ABSTRACT

The present invention relates to a method for positioning a milling drum box of a ground milling machine, in particular of a road milling machine, a recycler or a stabilizer, arranged on a machine frame relative to the ground, comprising the steps of: detecting the presence or absence of a ground contact, in particular in a region located in the front or a region located in the rear in the working direction (a), of at least one side plate of the milling drum box of the ground milling machine, and controlling a lifting and/or a lowering of the machine frame depending on the detected presence or absence of a ground contact. The present invention also relates to a ground milling machine for carrying out the method.

19 Claims, 5 Drawing Sheets

(51) Int. Cl.
*B60G 3/01* (2006.01)
*G01B 5/18* (2006.01)

(52) U.S. Cl.
CPC ...... *B60G 2300/09* (2013.01); *B60G 2300/37* (2013.01); *G01B 5/18* (2013.01)

(58) Field of Classification Search
CPC .............. G05D 1/0219; B60G 2300/37; B60G 2300/09; B60G 3/01; E21F 13/025
See application file for complete search history.

(56) References Cited

U.S. PATENT DOCUMENTS

2014/0379227 A1 12/2014 Reuter et al.
2015/0137577 A1 5/2015 Berning et al.

* cited by examiner

METHOD FOR POSITIONING A GROUND MILLING MACHINE RELATIVE TO THE GROUND, AND GROUND MILLING MACHINE

CROSS-REFERENCE TO RELATED APPLICATION

The present application claims priority under 35 U.S.C. § 119 of German Patent Application No. 10 2016 007 596.1, filed Jun. 21, 2016, the disclosure of which is hereby incorporated herein by reference in its entirety.

FIELD OF THE INVENTION

The present invention relates to a method for positioning a milling drum box of a ground milling machine, in particular a road milling machine, a recycler or a stabilizer, arranged on a machine frame, relative to the ground. The present invention also relates to a ground milling machine, in particular a ground milling machine by means of which the method according to one embodiment of the present invention is carried out.

BACKGROUND OF THE INVENTION

Generic ground milling machines, such as road milling machines, recyclers, stabilizers or surface miners, are used for street and roadway construction or for exploitation of mineral resources. They comprise a machine frame supported by undercarriages, on which a milling drum rotatably mounted in a milling drum box is arranged. By rotation of the milling drum fitted with milling tools, the ground milling machines remove the ground up to a desired depth in the working direction. The undercarriages of the ground milling machines may be crawler tracks as well as wheels. Usually, they are connected to the machine frame via height-adjustable lifting columns. By height adjustment of the lifting columns, the entire machine frame together with the milling drum box is raised or lowered, and thereby the milling depth of the milling drum can also be adjusted. Further, it is possible to adjust individual lifting columns, the two front-side or the two rear-side lifting columns together, for adjusting the longitudinal inclination of the ground milling machine (i.e., the horizontal inclination in the milling direction) and/or the two lifting columns located on the right or on the left with respect to the longitudinal center of the machine, for adjusting the transverse inclination of the ground milling machine (i.e., the horizontal inclination transversely to the milling direction). Typically, a control unit is provided that controls, inter alia, said height adjustment according to the input of the driver of the ground milling machine.

Usually, the milling drum is rotatably mounted in a milling drum box that is typically attached to the machine frame and, in particular, moves up and down with said frame when the height of the machine frame is adjusted via the lifting columns of the undercarriages. The milling drum box encloses the milling drum in the type of a hood and is open towards the ground. Usually, it comprises two side plates that confine the milling drum box in parallel to the working direction. The side plates are generally mounted so as to be movable relative to the machine frame, and are, in particular, height-adjustable in the vertical direction. For this purpose, at least one actuator is hinged at the side plate, which actuator can drive the height adjustment movement of the side plate. This actuator may further be arranged on the machine frame or on the milling drum box, for example. Ideally, two actuators are provided per side plate, specifically, one actuator positioned in the front and one actuator positioned in the rear in the working direction, which connect the machine frame and/or the milling drum box to the side plate and can move the latter up and down. Such an arrangement may be provided for the right-hand side plate as well as for the left-hand side plate viewed in the milling direction. As an alternative to hydraulic cylinders, electrical actuators, in particular electrical linear motors/actuators, may also be employed. During working operation, the side plates rest on the ground and slide over the latter by means of sliding shoes. Together with the other parts of the milling drum box, they prevent milled material from being thrown out of the milling track.

At the beginning of a milling process, the milling drum has to be lowered to a desired milling depth. This usually takes place by means of an automatic mechanism that adjusts the lifting columns of the undercarriages of the ground milling machine and/or the axis of rotation of the milling drum in the milling drum box, until a desired value is achieved. Often, however, the automatic system adjusts, for instance, the at least one front-side lifting column only, and thereby, after bringing the milling drum in place, the ground milling machine or the machine frame thereof, respectively, will be oriented obliquely to the ground. However, since, for instance, for reasons of machine stability and the full use of the machine weight as a counter-weight for the operation of the milling drum, it is beneficial if the ground milling machine, respectively the machine frame thereof and/or the milling drum box is arranged as parallel as possible to the ground during operation, the driver of the ground milling machine has to manually correct the height of the at least one rear-side lifting column until the machine frame and thus the milling drum box are parallel to the ground by visual estimate.

DE 10 2006 062 129 A1 discloses a ground milling machine of the generic type, in which for detecting the orientation of the machine, sensors are provided that detect the distance of the machine to the ground at different positions as well as the depth of the milling track. These values also allow for determining the position of the machine relative to the ground, so that said machine can be positioned in parallel.

From DE 11 2012 005 425 T5, it is known to provide side plate sensors to be contacted by the ground. Here, the side plate sensors are located directly in the working area of the milling drum and thus in an area affected by dirt. This may be disadvantageous for the functioning of these side plate sensors.

It is the object of the present invention to provide an option by means of which a ground milling machine or the milling drum box thereof, respectively, can be brought into a desired position relative to the ground, for instance, in parallel, without this being effected by manual adjustment using the driver's visual estimate. It is therefore another object to assist the driver of the ground milling machine when positioning the machine. At the same time, dirt in the area of the milling drum box should affect these adjustments as little as possible.

SUMMARY OF THE INVENTION

The method according to one embodiment of the present invention comprises the following steps: detecting the presence or absence of a ground contact of at least one side plate of the milling drum box of the ground milling machine, in particular in a region located in the front or in the rear in the working direction, by measuring a change in an operating parameter of at least one actuator that is configured for height adjustment of the side plate, and controlling a lifting and/or a lowering movement of the machine frame depending on the detected presence or absence of ground contact. Here, the working direction refers to the direction in which the ground milling machine moves during working operation, i.e., during the milling process. Here, a region of the side plate located in the front or in the rear, respectively, in the working direction refers to the edge of the side plate facing the ground, on which edge a sliding shoe is preferably provided by means of which the side plate slides over the ground during working operation. Here, the region located in the front or in the rear in the working direction is, for example, the front or the rear half of the total length of said edge or said sliding shoe. Instead of one half, the respective region is preferably one third, more preferably one fourth and most preferably one fifth of the total length of this edge or sliding shoe. Ground contact herein refers to the side plate touching the ground. It is essential, now, that for detecting the ground contact, no separate ground contact sensor directly actuated by the ground is required. Rather, the ground contact is detected with the aid of the actuator that actually is provided for height adjustment of the side plate. Said actuator thus has a double function according to the present invention. An operating parameter herein is a parameter that depends on the position and/or movement of the actuator, in particular in the drive train of the actuator. Thus, according to one embodiment of the present invention, the ground contact is detected by an action of a force of the ground acting on the side plate and therefore indirectly on the actuator, due to the ground contact, which, for instance, can trigger a minimum adjustment and/or force action on the actuator and therefore in the drive train of the actuator connected downstream the actuator when viewed from the ground. The ground contact thus indirectly also influences the drive train of the actuator via the side plate and the actuator, which according to the present invention is used for detecting the ground contact of the side plate. By the preferred detection of a ground contact at at least two locations of the ground-side edge of the side plate, i.e., by two actuators, or one actuator located in the front in the milling direction and one actuator located in the rear in the milling direction, the positioning of the ground milling machine in the working direction with respect to the ground, or, in other words, the longitudinal position or the longitudinal inclination, can be determined. When the respective detection is carried out at the two side plates spaced form one another transversely to the working direction, through in each case one actuator of the ground milling machine, for example, the position of the ground milling machine transversely to the working direction with respect to the ground, or, in other words, the transverse position or the transverse inclination, can also be detected. By a corresponding activation of the lifting columns in response to the respectively detected ground contacts and/or their absence, the ground milling machine can be brought into a desired position with respect to both its longitudinal inclination as well as its transverse inclination relative to the ground without having to rely on the visual estimate of the driver.

At the beginning of a working process, the ground milling machine and thus the milling drum, too, are in a raised condition. For the milling process, the machine and with it the milling drum have to be lowered until the milling drum engages the ground to be processed in a desired milling depth. The milling drum is to be lowered into the ground by a predetermined value for achieving the milling depth. This process is referred to as engaging or initial milling, and therefore during this process the ground milling machine is in the engaging mode. Preferably, the two side plates, respectively positioned at the face side transversely to the axis of rotation of the milling drum, or the sliding shoes thereof, are oriented in parallel to the machine frame of the ground milling machine. The sliding shoes extend substantially rectilinear in their ground contact area. The "parallel positioning" of the side plates to the machine frame is, for instance, achieved by extending the actuators, in particular hydraulic cylinders and/or electrical actuators, by means of which the side plates are movable relative to the machine frame, to a maximum extent. In the position extended or lowered to a maximum extent, thus the sliding shoes preferably extend in parallel to the horizontal position of the machine frame. Thus, the relative position of the sliding shoes with respect to the rest of the machine in this position is known and serves as a reference in the present case. According to one embodiment of the present invention, all lifting columns of the undercarriages are retracted in the same way and at the same time, for example, in order to lower the milling drum to the desired milling depth. Meanwhile it is monitored, in particular continuously, via the respective actuators, preferably at at least two locations of the ground-side edge or ground-side sliding shoe spaced in the working direction, whether there is a ground contact or no ground contact at these locations of the side plate.

In order to position the side plates in parallel to the ground, it is preferred that the lowering movement of the machine frame is stopped through front-side lifting columns in the working direction of the machine frame in the positioning operational mode when a ground contact is detected in the side plate region located at the front in the working direction, and/or the lowering movement of the machine frame is stopped through lifting columns of the machine frame located in the rear in the working direction, when a ground contact is detected in the side plate region located in the rear in the working direction. This means that in these cases, with respect to the rear-side/front-side in the working direction, the lowering movement of the machine frame continues only at locations where no ground contact of the respective side plate was detected through the front-side and/or rear-side actuator. If the side plate with its ground-side edge or sliding shoe contacts the ground only in the front or rear region in the working direction, then this means that the corresponding edge/sliding shoe of the side plate is not parallel to the ground but oblique. This inclination occurs if the side plate contacts the ground only with a section located at the front or in the rear in the working direction instead of resting on the ground over its entire length. By stopping the lowering movement through the lifting columns of the undercarriages on that side of the side plate where the ground contact is detected with simultaneous continuation of the lowering movement on the respective other side, the inclination of the ground milling machine relative to the ground is reduced. As soon as a ground contact is then detected on both sides of the respective side plate, the side plate is positioned in parallel to the ground. If further parts of the ground milling machine were parallel to the side plates at the beginning of the engaging mode, for example, the milling drum box and/or the machine frame, these parts are thereby also oriented in parallel to the ground. Thereafter, further lowering of the machine is effected for achieving the desired milling depth, in particular such that all lifting columns retract uniformly and by identical distances, until the desired milling depth is achieved.

In order to lower the milling drum to the desired milling depth in the engaging mode, it is preferred for the lowering of the machine frame to occur uniformly through lifting columns located in the rear and front in the working direction as long as no ground contact is detected or as soon as a ground contact was detected in both the region of the side plate located in the front in the working direction as well as in the region of the side plate located in the rear in the working direction, and/or the lowering of the machine frame occurs uniformly through lifting columns located on the right and on the left in the working direction as long as no ground contact is detected or as soon as a ground contact was detected on both the side located on the left in the working direction as well as on side located on the right in the working direction. The lowering of the machine frame, and with it that of the milling drum box, the side plates and the milling drum, thus initially takes place simultaneously through lifting columns of the undercarriages located in the front and in the rear in the working direction. Then, a ground contact is detected at least in one of the regions of the side plate according to one embodiment of the present invention, whereby the lowering movement is continued only at the respective other side of the ground milling machine. This one-sided lowering movement is carried out until a ground contact is also detected in the other region of the side plate. At this point of time, the side plate is positioned in parallel to the ground. Additionally, or alternatively, this can also take place through the right and left lifting columns. Now, the height adjustment of the ground milling machine can again occur simultaneously and uniformly via all lifting columns until the desired milling depth is achieved.

Preferably, in a transverse inclination mode, the lowering of the machine frame through lifting columns of the machine frame positioned in the front and the rear in the working direction on one machine side in the working or milling direction is stopped when a ground contact is detected via the side plate positioned on this machine side, and/or the lowering of the machine frame through lifting columns of the machine frame disposed on the other machine side in the working direction is stopped when a ground contact is detected via the side plate positioned on this other machine side. In this mode, thus the transverse positioning of the machine in the horizontal plane or, in particular, the adjustment of the inclination of the axis of rotation of the milling drum relative to the ground, more particularly the parallel positioning thereof relative to the ground, takes place.

In order to assist the driver of the ground milling machine in the positioning of the machine relative to the ground, it is further preferred that the method steps are performed by a control unit in a coordinated and, to the greatest extent possible, automated manner, in particular in such a way that the ground milling machine is lowered to a predetermined milling depth, in particular with a predetermined longitudinal and/or transverse inclination, with the machine frame of the ground milling machine and respectively the milling device preferably being positioned in parallel relative to the ground. In this way, the method according to one embodiment of the present invention allows for the driver to merely specify the desired value for the milling depth, and the control unit executes the method according to the present invention, if required, together with further automatic leveling functions. Thereby, the ground milling machine is lowered to the desired milling depth and is positioned in parallel to the ground without the driver having to correct the orientation of the machine manually. The control unit may, for instance, be integrated in the on-board computer of the ground milling machine. It is provided, herein, that the positioning of the entire machine is ultimately achieved by the fact that the ground contact of the side plates can precisely be detected in an indirect manner by the detection of the operating parameters at the individual actuators, without using separate contact sensors. This is, in particular, advantageous in that for this purpose, for instance, no separate sensor is required in the area exposed to dirt.

Shortly after the beginning of the milling process, when the ground milling machine has started advancing in the working direction, the at least one rear-side undercarriage of the ground milling machine moves into the newly created milling track, whereby the rear part of the ground milling machine is displaced downwardly by the milling depth. In order to reposition the machine in parallel to the ground, it is then necessary to move the at least one rear-side undercarriage through the corresponding lifting column upwardly again, in order to compensate for the different moving plane of the rear-side undercarriage. This mode, in which the entry of the rear-side undercarriage into the milling track is detected and compensated for, is referred to as compensation mode. In order to simplify this mode, it is provided in one embodiment of the method according to the present invention that after reaching a predetermined milling depth in the compensation mode, a force directed to the region of the side plate located in the rear in the working direction and away from the ground is measured, and the lifting movement of the machine frame through the lifting columns of the machine frame located in the rear in the working direction is performed if the measured force in the region located in the rear in the working direction of the side plate exceeds a predetermined threshold value. The measurement of this force preferably also occurs indirectly via the actuator located in the rear, in particular indirectly from its drive train. During the milling process, the side plates of the ground milling machine are in contact with the ground and slide on the latter. When the rear-side undercarriages retract into the newly formed milling track, then the rear chassis portions will sink in by the height of the milling track. This results in an inclined position of the ground milling machine relative to the ground, and the at least one side plate is pressed onto the ground in its region located in the rear in the working direction. This pressing force acting on the side plate can be detected according to the present invention, so that the entering of the rear-side undercarriage into the milling track can be detected. The threshold value for the force is selected such that normal variations by unevenness in the ground will not cause interference, and entering of the rear-side undercarriages into the milling track is reliably recognized. Then, the rear-side lifting column, preferably also in a manner coordinated by the control unit, can be raised until the force measured at the side plate subsides again or is reduced to the value of the ground contact in the engaging mode. In this state, the ground milling machine is then again oriented in parallel to the ground. The compensation mode described above is further used correspondingly also when driving over obstacles. A shift between the engaging mode and the compensation mode may preferably also take place automatically, in particular depending on a driving movement of the machine. When the ground milling machine is set in motion from the engaging mode, in particular by a corresponding control unit, a changeover to the compensation mode is effected automatically, for instance, after traveling a previously set delay distance. The detection of the travel movement is effected through a suitable sensor and/or by monitoring command inputs, for example.

It is possible that the driver of the machine manually changes between the engaging mode and the compensation mode. Preferably, however, this takes place in an automated manner. For this purpose, it can, for example, be provided that an automatic shift into the compensation mode is effected when the ground milling machine moves or travels in the working direction.

In principle, detection and measurements according to one embodiment of the present invention can be achieved with different sensors known from the prior art. What is essential is that, in particular, the detection of the ground contact and/or the force exerted by the ground contact indirectly on the actuator takes place indirectly in the manner described above. For this purpose, preferably the measurement of a change in an operating parameter of the at least one actuator is effected by measuring or detecting an operating parameter of an actuator, in particular an actuator driven by electric or hydraulic energy for height adjustment of the side plate, directly or indirectly from the drive train thereof, wherein a suitable sensor is used for detecting and/or monitoring this operating parameter. It is thus preferred that, according to one embodiment of the present invention, the detection of the presence or absence of a ground contact and/or the measurement of the force is effected, for example, by measuring pressure changes at and/or volume flow changes to or from a hydraulic cylinder serving as an actuator and located in the front in the working direction and in the rear in the working direction, by means of which the side plate of the milling drum box of the ground milling machine is movable relative to the machine frame. Thus, detection of the ground contact takes place in the drive hydraulic circuit of the actuator, in particular. In this way, cost-effective pressure or volume flow sensors can be installed in the hydraulic system moving the hydraulic cylinder, preferably in the lines of the hydraulic cylinders. Thus, the present invention can be carried out with minimum adjustments of the already provided components of the ground milling machine. When a hydraulic cylinder of the side plate by ground contact is applied with pressure, said pressure can be measured in the hydraulic cylinder and/or in the hydraulic lines directly at the hydraulic cylinder. A pressure on the hydraulic cylinder can also be determined as a volume flow in the hydraulic lines on the hydraulic cylinder. The force acting on the side plate can also be determined in this way, so that a simple and cost-effective implementation of the present invention is made possible. It is not necessary here that the pressure or the volume flow or the force is quantitatively determined as long as a qualitative decision is possible as to whether a ground contact exists and/or a force corresponding to the rear-side lifting column entering into the milling track acts on the cylinder located in the rear and/or the front in the working direction of the side plate. However, for a quantitative decision it is essentially necessary to detect the actual change in the angle of the longitudinal position and forward it to the control algorithm. Alternatively, for instance, the use of electrically driven actuators is possible. Due to the contact with the ground, an electric drive can then, through the force and adjusting action by the ground on the side plate and thus on the actuator, act as a generator in the short term. The ground contact can then be determined via a change in electrical operating parameters, for instance, a current or a voltage.

Altogether, it is therefore preferred if hydraulic or electrical operating parameters are used here. The method according to one embodiment of the present invention thus preferably includes the detection of pressure changes at and/or volume flow changes, in particular, to or from a hydraulic cylinder located in the front in the working direction or located in the rear in the working direction, by means of which the side plate of the milling drum box of the ground milling machine is movable relative to the machine frame. Additionally, or alternatively, according to one embodiment of the present invention comprises detecting current and/or voltage signals of an electric drive, in particular as a part of a linear electric actuator with a screw drive, specifically located in the front in the working direction and/or an electric drive located in the rear in the working direction, by means of which the side plate of the milling drum box of the ground milling machine is movable relative to the machine frame. In principle, all such operating parameters can be considered according to the present invention which significantly change when the drive train of the respective actuator is influenced by the action of a force when the side plate contacts ground.

The object is also specifically achieved with a ground milling machine, in particular for carrying out the method according to the present invention. The ground milling machine is, in particular, a road milling machine, a recycler or a stabilizer. The ground milling machine includes a machine frame, at least one undercarriage located in the front in the working direction, and at least one undercarriage located in the rear in the working direction, that are connected by at least one front-side lifting column and at least one rear-side lifting column with the machine frame and support the latter, a milling drum box arranged on the machine frame including a housing and at least one side plate being height-adjustable by at least one actuator, a milling drum rotatably supported in the milling drum box horizontally and transversely to the milling direction, and a control unit, at least one sensor being provided that is configured for detecting changes in at least one operating parameter within a drive train of an actuator for height adjustment of the side plate, in particular, arranged in a region located in the front in the working direction and/or the rear in the working direction, in order to detect a ground contact of the side plate. Thereby is indirectly achieved the detection the presence or absence of a ground contact of the side plate, in particular in the region of the side plate located in the front and/or the rear in the working direction. According to one embodiment of the present invention, the control unit is configured such that it controls a lifting and/or a lowering of the machine frame depending on the detected presence or absence of a ground contact. All effects and advantages of the present invention described in the context of the method correspondingly also apply for the ground milling machine according to the present invention, by means of which the method is carried out. The above-described detection of the ground contact is thus achieved by at least one sensor disposed in the drive train of the respective actuator, by means of which an operating parameter of the actuator can be detected. This allows for indirectly detecting the contact of the side plate with the ground, since in the case of a contact of the side plate, the ground will exert a force on the side plate that also acts, via the actuator, on the drive train of the actuator. According to one embodiment of the present invention, this is used to detect and adjust, in the ground milling machine according to the present invention, the position relative to the ground when carrying out the method.

Generally, one single actuator can be used per side plate. It is however preferred if the side plate includes an actuator located in the front in the working direction and located in the rear, in the working direction, and if in each case one sensor is provided for detecting a presence or absence of a ground contact in the drive train located in the front in the working direction, as well as in the drive train of the actuator located in the rear in the working direction. Thereby, the transverse inclination as well as the longitudinal inclination of the machine relative to the ground can be determined precisely.

It is also preferred for the ground milling machine, according to one embodiment of the present invention, that the control unit is configured such that it stops a lowering movement of the machine frame by the front-side lifting columns in the engaging mode when a sensor indirectly detects a ground contact in an area of the side plate located in the front in the working direction in the manner described above and/or stops a lowering movement of the machine frame through the rear-side lifting columns when a sensor indirectly detects a ground contact in the manner described above in the region of the side plate located in the rear in the working direction. In this way, a parallel positioning with respect to the longitudinal inclination of the ground milling machine to the ground is enabled by means of the detection of the ground contact of the side plate. Additionally, or alternatively, it is also preferred if the control unit is configured such that, in a transverse inclination mode, it stops the lowering movement of the machine frame via lifting columns of the machine frame positioned, in the working/milling direction, on one machine side at the front side and the rear side, in the working direction when via the side plate positioned on this machine side with the aid of a sensor, in the manner described above, a ground contact is indirectly detected, and/or stops the lowering movement of the machine frame through lifting columns of the machine frame positioned on the other machine side in the working/milling direction when via the side plate positioned on this other machine side with the aid of a sensor, in the manner described above, a ground contact is indirectly detected. Thus, each side plate then includes one rear-side and one front-side actuator driven through a drive train. A sensor is assigned to each drive train for detecting an operating parameter of the drive train. Each sensor is connected to the control unit.

For simplifying the operation of the ground milling machine in the compensation mode it is preferably provided that at least the sensor located in the rear region of the side plate in the working direction is configured such that it can detect an operating parameter in the drive train of the actuator varying with a force at the side plate directed away from the ground, and that the control unit is configured in such a way. From the change in the operating parameter, the control unit can also determine the acting force. It is now provided that the control unit is configured such that in the compensation mode it performs a lifting of the machine frame via the lifting columns of the machine frame located in the rear in the working direction, when the measured force or the operating parameter correlated with the force or the change thereof exceeds a predetermined threshold value in the region of the side plate located in the rear in the working direction.

In order to keep the structure of the ground milling machine as simple as possible, and to thus save costs, it is preferred that the side plate is movably supported relative to the machine frame and/or the rest of the milling drum box via an actuator located in the front in the working direction and an actuator located in the rear in the working direction, and that the sensors detect the presence or absence of a ground contact in the region of the side plate located in the front and/or the rear in the working direction of the side plate and/or the force acting on the side plate and being directed away from the ground by measuring of a change in pressure at the hydraulic cylinders and/or a change in volume flow to or from the hydraulic cylinders and/or a change in an electric operating parameter, in particular, of a current and/or voltage of an electrical drive unit, in particular, located in the front in the working direction or located in the rear in the working direction, in particular as a part of an electrical linear actuator with screw drive, by means of which the side plate of the milling drum box of the ground milling machine is movable relative to the machine frame. Here, it is also essential that the ground contact is thus not determined by special tactile sensors that are directly actuated by the ground surface, but that, according to the present invention, the fact is used that the ground, as soon as a ground contact of the side plate occurs, exerts a counter-force that influences operating parameters of an actuator for height adjustment of the side plate, in particular also in the drive train thereof.

Basically, any hydraulic resistance can be used for the measurement in the case of a hydraulic actuator, for instance. A particularly simple construction of the ground milling machine is achieved if the sensor includes a measurement orifice that is disposed on the piston side at the hydraulic cylinders of the side plate located in the front and/or the rear in the working direction, in particular in the hydraulic lines leading to the piston side of the hydraulic cylinders. Measurement orifices detect pressure changes as well as volume flow changes at the hydraulic lines of the hydraulic cylinders and are thus optimally suitable to implement the present invention. A force acting on the side plate, in the compensation mode, can also be detected by the measurement orifices. Accordingly, electrical operating parameters are preferably used for electrically-driven actuators in the manner described above.

In order to be able to adjust the ground milling machine to different working situations, for example, if different milling widths with one and the same machine are to be realized, it is preferred for the milling drum box to be configured as a replaceable module, with all the sensors of the actuators of the side plates preferably being disposed, in particular, at the module and being exchangeable with the module. In this way, the sensors are always adapted to the respective milling drum box that may include, for instance side plates of different size and therefore of different weight. A modular design allows for fast replacement and for shorter refitting periods of the ground milling machine.

In order to ensure that the engaging of the milling drum to the predetermined milling depth takes place as precisely as possible, it is preferred that the control unit is configured such that during a lifting and/or a lowering of the machine frame, in the engaging mode, no manual control of the ground milling machine is possible, except for an emergency-stop command. Thus, the positioning of the ground milling machine and the milling depth cannot inadvertently be adjusted in a wrong way if the driver, during the engaging mode, issues further control commands.

BRIEF DESCRIPTION OF THE DRAWINGS

In the following, the present invention is described in more detail with reference to exemplary embodiments shown in the figures. In the schematic figures.

DETAILED DESCRIPTION OF THE INVENTION

Figure 1:
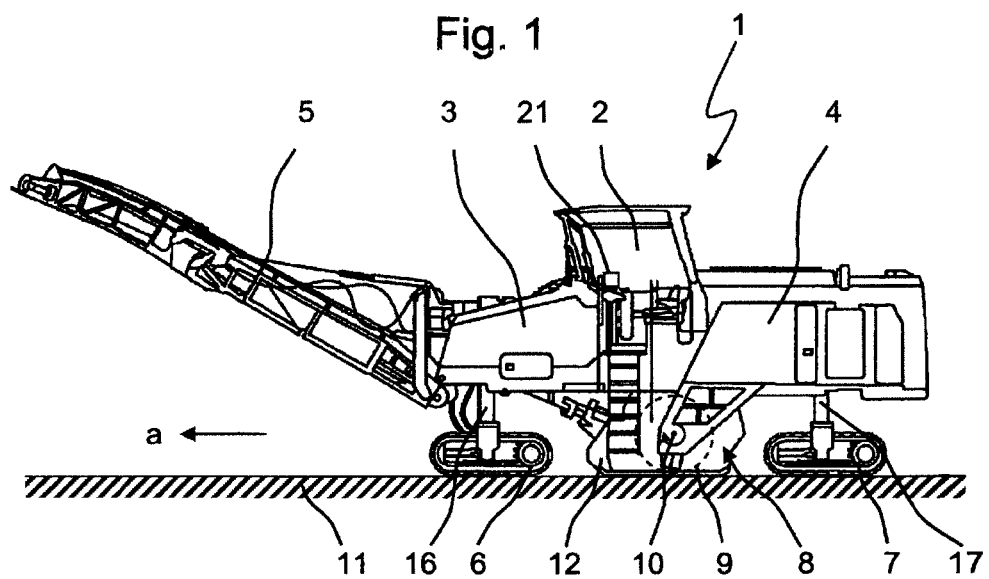
FIG. 1 is a side view of a ground milling machine.

FIG. 1 shows a ground milling machine 1 of the generic type, here a road milling machine. The ground milling machine 1 comprises an operator platform 2, a machine frame 3 and a drive unit 4 that comprises in most cases a diesel combustion engine. The machine frame 3 is supported by front-side lifting columns 16 with front-side undercarriages 6 and rear-side lifting columns 17 with rear-side undercarriages 7. The terms front and rear refer to the working direction a, in which the ground milling machine 1 moves during working operation by means of the undercarriages 6, 7. The lifting columns 16, 17 are adjustable in height, whereby the entire machine frame 3 is height-adjustable. A milling drum box 8 with side plates 12 (only the left-hand side plate is shown) is arranged on the machine frame 3. In the milling drum box 8, a milling drum 9 is rotatably supported about a horizontal axis of rotation 10 extending transversely to the working/milling direction a. By rotation of the milling drum 9, the latter removes, when the ground milling machine 1 advances in the working direction a, the ground 11 in a milling depth that can be set prior to operation. The milling depth can be varied by the height adjustment of the lifting columns 16, 17, for example. The removed milling material is removed from the milling drum box 8 and transferred via a conveyor belt 5 to a transport vehicle for transport (not shown). The control unit 21, by means of which the driver of the ground milling machine 1 can input various control commands and which coordinates the functions of the ground milling machine 1, is integrated into the on-board computer, for example.

FIGS. 2 to 5 show a detail of the ground milling machine 1 in the region of the milling drum box 8. A housing 15 of the milling drum box 8 stationary with the machine frame is indicated with a broken line. The side plate 12 of the milling drum box 8 is connected through an actuator located in the front in the working direction a and an actuator located in the rear in the working direction, in the present embodiment specifically in each case one hydraulic cylinder 13, 14, to the machine frame 3 or the housing 15 and is adjustable through these actuators or hydraulic cylinders 13, 14 in its height relative to the ground 11. In principle, it is also possible to provide only one actuator per side plate, in particular disposed on the level of the center of mass of the side plate.

Figure 2:
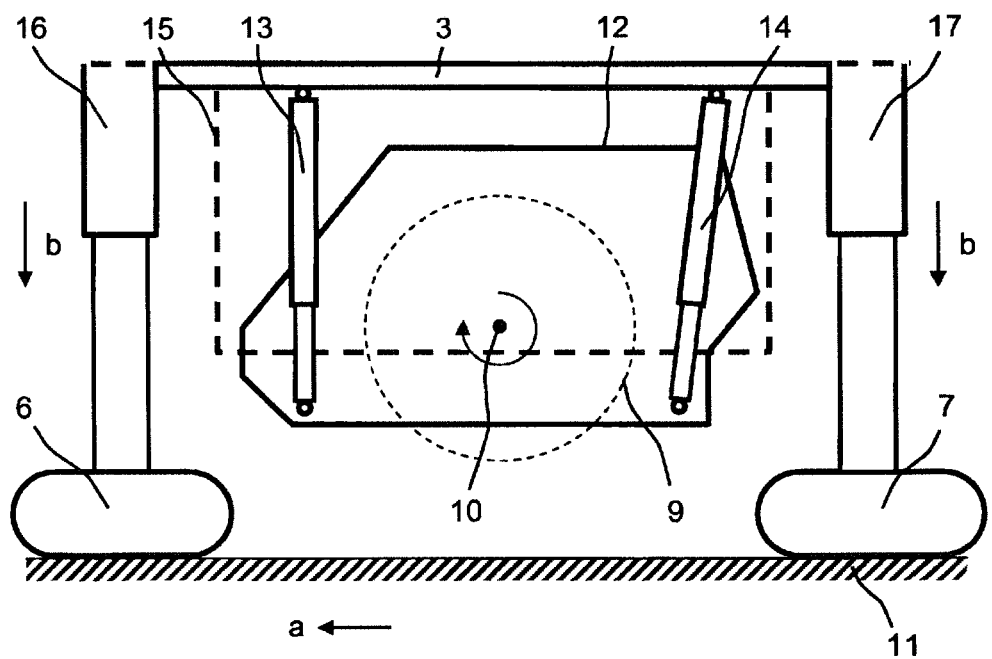
FIG. 2 is a side view of the undercarriage and of the milling drum box.

FIG. 2 shows the situation where the ground milling machine 1 is ready to start a new operating process. The lifting columns 16, 17 are extended so far that the milling drum box 8 with the side plate 12 and also the milling drum 9 do not have ground contact. The side plate 12 is oriented in parallel to the machine frame 3, for example, by extending the hydraulic cylinders 13, 14 to a maximum extent. The ground milling machine 1 can thus be transported to operating site. In order to start the milling process, the milling drum 9 has to be lowered in an engaging mode. To that end, the lifting columns 16, 17 are retracted so far that the rotating milling drum 9 is immersed into the ground 11 to a desired milling depth. By retracting the lifting columns 16, 17, the machine frame 3 and thus the milling drum box 8 and the milling drum 9 is moved in the lowering direction b toward the ground 11.

Figure 3:
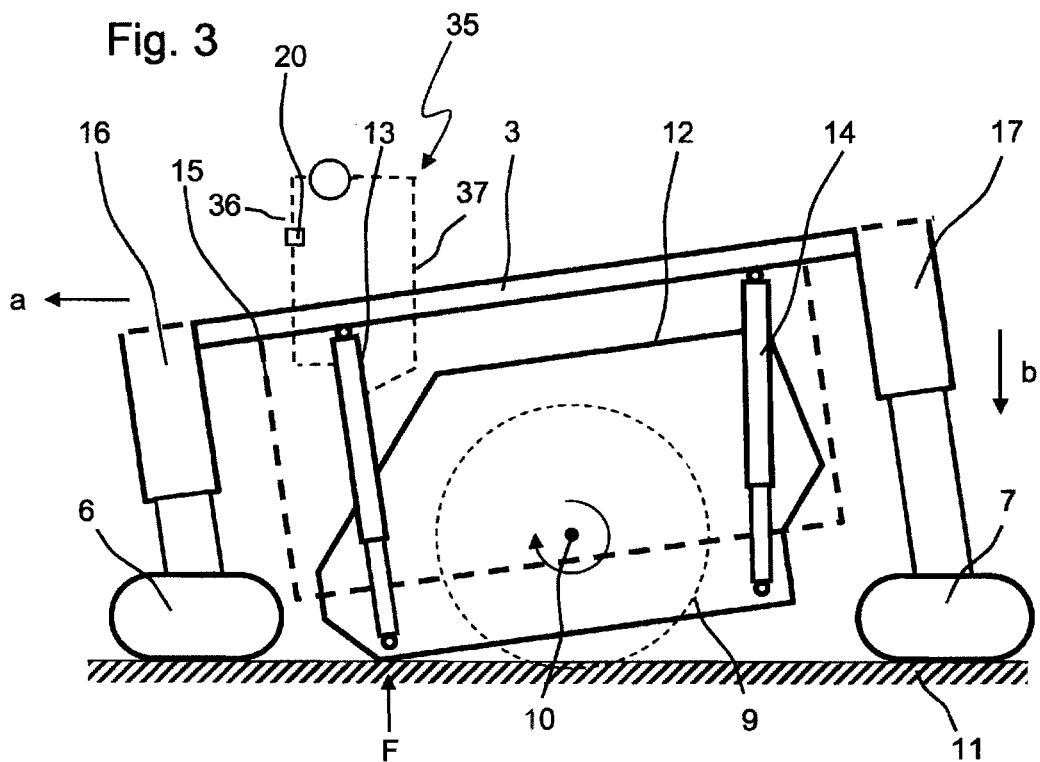
FIGS. 3-5 are further side views of the undercarriage and of the milling drum box in different operational situations.

FIG. 3 shows the ground milling machine 1 in the engaging mode, when the ground milling machine 1 is not parallel to the ground 11 with the machine frame 3 and/or retracting of the lifting columns 16, 17 does not take place uniformly or simultaneously. In the example of FIG. 3, the ground milling machine 1 is slightly inclined forward, in the working direction a, so that when lowering the milling drum box 8, the side plate 12 will first contact the ground 11 with a region located in the front on working direction a, that is, i.e., has ground contact in this region. According to one embodiment of the present invention, it is provided in this case, that the lowering of the machine frame 3 through the front-side lifting column 16 is interrupted or stopped as soon as ground contact is detected in the region of the side plate 12 located in the front in the working direction a. As indicated in FIG. 3, further lowering of the machine frame 3 in the lowering direction b is merely effected by the lifting column 17 located in the rear in the working direction a.

Figure 4:
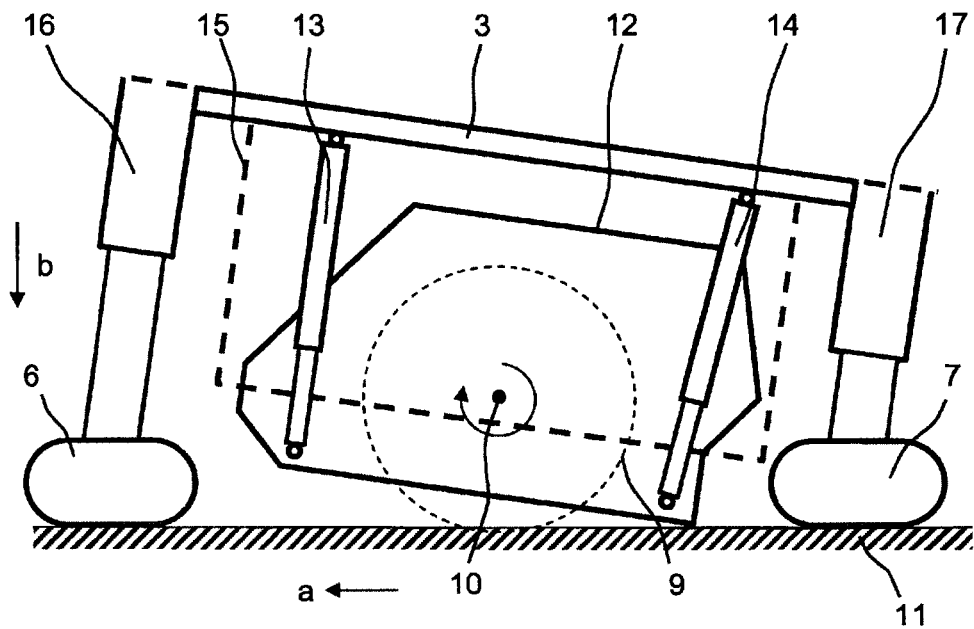

FIG. 4 shows an analogous situation to FIG. 3, only that in FIG. 4 the ground milling machine 1 is slightly inclined to the rear in the working direction a. Thereby, when lowering the milling drum box 8 via the lifting columns 16, 17, the side plate 12 first comes into contact with the ground 11 with a region located in rear in the working direction a. In this case, it is provided, according to the present invention, that due to the ground contact in the region located in the rear of the side plate 12, lowering of the machine frame 3 via the rear-side lifting column 17 is interrupted or stopped. Then, further lowering of the machine frame 3 in the lowering direction b will only be effected via lifting column 16 located in the front in the working direction a.

Figure 5:
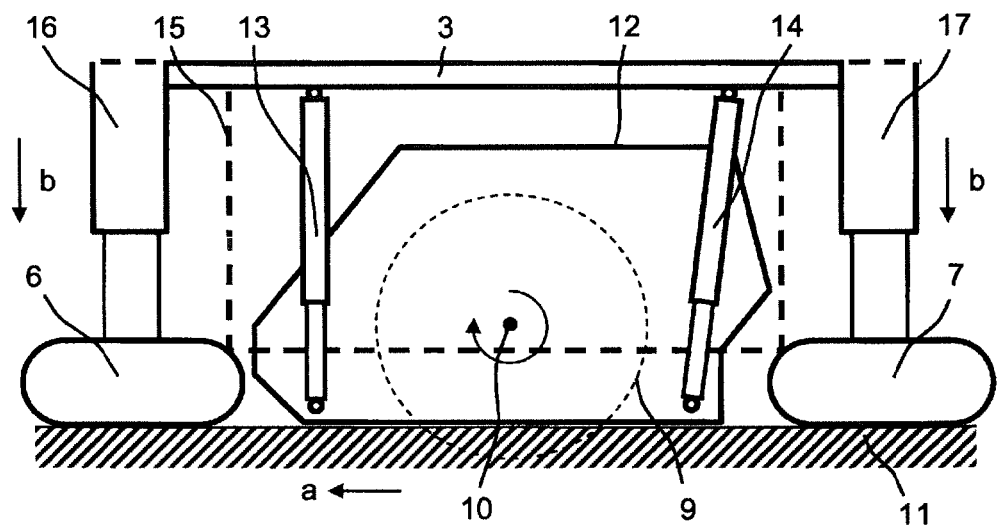

Lowering via the lifting column 16 or 17 in the respective situations of FIGS. 3 and 4 is continued until the situation of FIG. 5 is achieved. In FIG. 5, the milling drum box 8 was lowered via the lifting columns 16, 17 until the side plate 12 has ground contact in region located in the front in the working direction a as well as in its region located in the rear in the working direction a. As soon as this takes place, the side plate 12 is positioned in parallel to the ground 11. When the engaging mode has started in a situation where the side plate 12 or its edge or sliding shoe near the ground, with which the side plate 12 in the working operation slides over the ground 11, is positioned in parallel to the machine frame 3 of the ground milling machine 1, then the machine frame 3 is also positioned in parallel to the ground 11 as soon as the side plate 12 has ground contact in its region located in the front in the working direction a, as well as in its region located in the rear, in the working direction a. This results due to the fact, that the side plate 12 moves in parallel with the machine frame 3. As soon as the side plate 12 in effect rests in parallel to the ground 11 on the latter, the height of the machine frame 3 can again simultaneously be adjusted via the lifting columns 16, 17 located at the front and in the rear until the desired milling depth for the respective working process is achieved, as indicated in FIG. 5. After the desired milling depth has been achieved, the milling process in the working direction a can be performed, wherein advantageously the ground milling machine 1 is positioned in parallel to the ground 11 with its machine frame 3.

In FIG. 3 a drive train 35 for the front actuator 13 with two connection lines 36 and 37 and a power source 38 is further shown in an exemplary manner. If the actuator 13 is a hydraulic cylinder, as shown in FIG. 3, the connection lines are feed and discharge lines for hydraulic fluid from and to the hydraulic cylinder. The power source is then a hydraulic pump, for example. In contrast, if the actuator 13 is an electrically-driven actuator, in particular an electrical linear actuator with screw drive, then the connection lines are lines for forwarding electrical energy. The drive energy source 38 is then a current source, for example the on-board electrical grid of the machine. In this case, instead of the hydraulic cylinder, a threaded screw driven by an electric motor is provided in the actuator 13, via which can be achieved a longitudinal displacement or an active height adjustment of the side plate 12. Furthermore, a sensor 20 is integrated in the connection line 36, by means of which an operating parameter of the shown drive train 35, for example, the internal pressure in a hydraulic line, or an electrical parameter, depending on the type of actuator, can be detected and monitored. The sensor is connected to a control unit in the manner described in more detail below.

Figure 6:
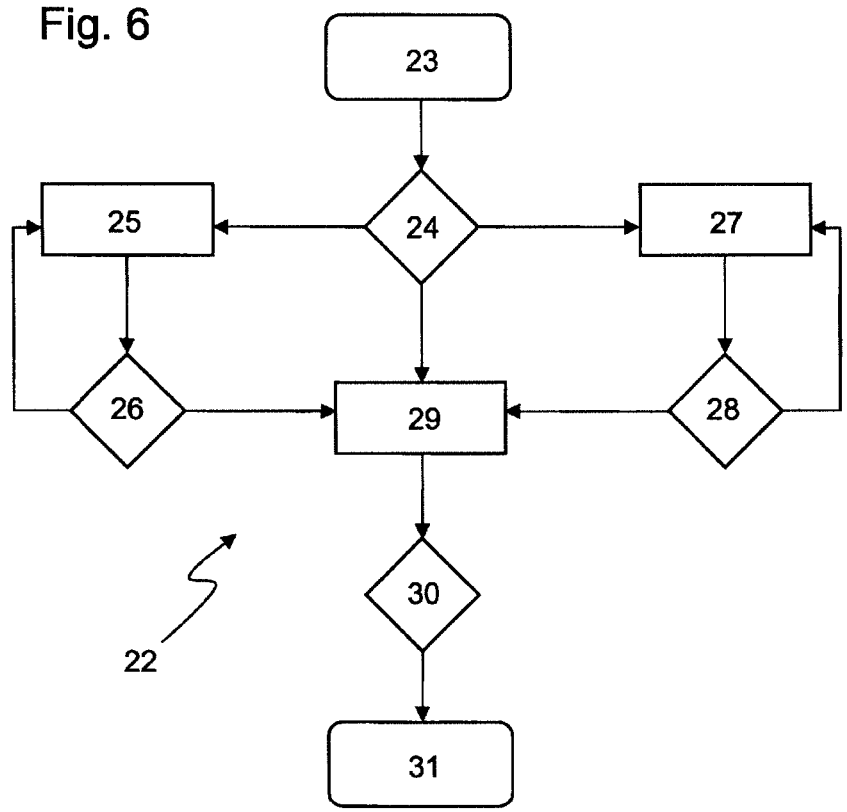
FIG. 6 is a flowchart of the method in the engaging mode.

FIG. 6 clarifies the method 22 according to the present invention with reference to a flow chart. The method 22 starts in step 23, when the engaging mode of the ground milling machine is started and the machine frame 3 is moved via the lifting columns 16, 17 in the lowering direction b toward the ground 11. From the beginning of the method 22 it is continuously measured, at the side plate 12 of the ground milling machine 1, whether there is ground contact, and whether this ground contact is in the region of the side plate 12 in the front or in the rear in the working direction a, (situation of FIG. 2). For this purpose, according to the present invention, an operating parameter of the drive train 35 of at least one actuator for height adjustment of the side plate is monitored. In step 24, at least one ground contact at the side plate 12 is detected as an operating parameter of the drive train 35 changes in a characteristic manner, as further described in the following.

When there is ground contact in the region of the side plate 12 located in the front in the working direction a (situation the FIG. 3), then, in step 25, further lowering takes place only by means of lifting column 17 located in the rear in the working direction a, the lowering through lifting column 16 located in the front in the working direction a, is however interrupted. In step 26, it is verified whether with further retracting of the lifting column 17 a ground contact in the region of the side plate 12 located in the rear in the working direction a is also detected. For this purpose, an operating parameter of the drive train of the rear actuator 14 is monitored. As long as this is not the case, the lowering through the rear-side lifting column 17 is continued, according to step 25. However, once a ground contact is also detected in the region of the side plate 12 located in the rear in the working direction a, the method is continued in step 29.

If a ground contact is detected, in step 24, in the region located in the rear of the side plate 12 in the working direction a (situation of FIG. 4), then the method continues in step 27, in which the lowering through the lifting column 17 located in the rear in the working direction a is interrupted, whereas the lowering through the lifting column 16 located in the front in the working direction a is continued. In step 28, it is then verified whether during this unilateral lowering through the front-side lifting column 16, a ground contact also occurs in the region of the side plate 12 located in the front in the working direction a. As long as no ground contact is detected here, the unilateral lowering according to step 27 is continued. As soon as a ground contact is also detected in the region of the side plate 12 located in the front in the working direction a, the method is continued in step 29.

Step 29 is initiated if there is ground contact in steps 24, 26, or 28, both in the region located in the front in the working direction a of the side plate 12 and in the region of the side plate located in the rear in the working direction a (situation of FIG. 5). In step 29, the machine frame 3 of the ground milling machine 1 is moved again, just like at the beginning in step 23, through the lifting columns 16, 17 located in the front as well as in the rear in the working direction further down in the lowering direction b. This lowering is continued until, in step 30, the milling drum 9 has reached the desired milling depth. As soon as this is the case, the method can be terminated in step 31. The machine frame 3 is then substantially parallel to the ground 11, and the milling process can start.

What is now essential for the outlined method is that the determining of the ground contact occurs in an indirect manner. Here, use is made of the fact that the ground, during the lowering, exerts a force on the side plate, as indicated by the arrow F in FIG. 3. This force causes an actuating force on the actuator 13 in its retraction direction and, thus in the present case slightly compresses the actuator, viewed in its linear adjusting direction (or in direction of the lifting movement of the side plate). Thereby, the ground contact also affects the drive train 35 of this actuator 13 connected, when viewed from the ground, downstream the actuator 13. According to one embodiment of the present invention, this is used for the indirect detection of the ground contact, whereby it is possible, in an advantageous manner, to dispense with a ground contact sensor to be directly contacted by the ground in the area of the side plate exposed to dirt.

Figure 7:
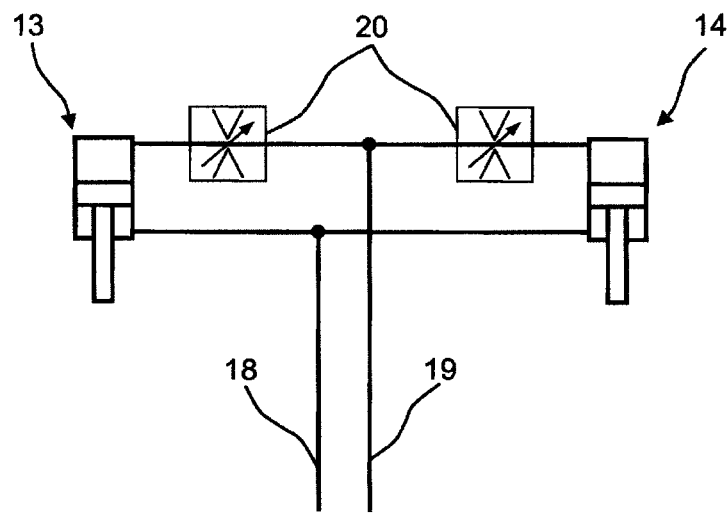
FIG. 7 shows a hydraulic circuit of a side plate.

For a more detailed illustration of this approach according to one embodiment of the present invention, FIG. 7 shows a detail of the hydraulic circuit of the side plate 12 of the ground milling machine 1 or specifically of the drive train 35 of FIG. 3, with the two actuators 13 and 14 being connected in a common drive train. The front-side hydraulic cylinder 13 and the rear-side hydraulic cylinder 14 are connected to the hydraulic system of the ground milling machine 1 by a first line 18 and a second line 19 and are supplied with hydraulic fluid through these lines 18, 19, but can also be supplied separately, however. In the exemplary embodiment shown, there are sensors 20 for detecting and monitoring an operating parameter of the hydraulic drive train, in the lines 18, 19 connected on the piston side to the hydraulic cylinders 13, 14, in direct vicinity of the hydraulic cylinders 13, 14, these sensors specifically being configured as measurement orifices here. The sensors 20 detect pressure changes or volume flow changes in the hydraulic lines that are caused, for example, by forces transmitted to the hydraulic cylinders 13, 14 and acting on the side plate 12, in particular forces originating from the ground, when the side plate is placed on the ground. By the interaction of the pressure and the volumes on the piston side and the piston rod side of the hydraulic cylinders 13, 14, it is understood that the sensors 20 may also be arranged in the lines that are connected to the piston rod side of the hydraulic cylinders. What is important is that a change in pressure or a change in volume flow in the hydraulic lines of the hydraulic cylinders 13, 14 can be measured or detected, and that this measurement or detection can clearly be assigned to the region of the side plate 12 located in the front or in the rear in the working direction a. It has to be considered that, when doing so, the side plates 12 are not actively raised during the lowering movement of the machine d, but are usually passively in their positions lowered to a maximum extent.

Figure 8:
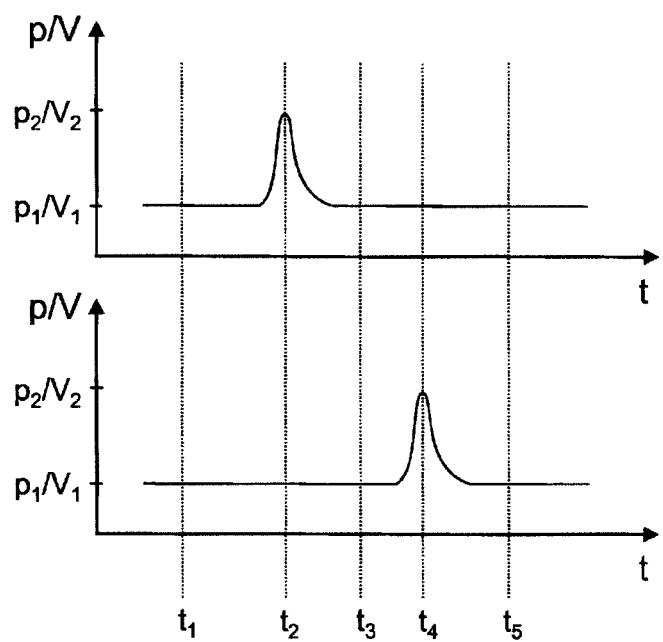
FIG. 8 is a diagram of the pressure or volume flow on the sensors over time.

In the diagrams of FIG. 8, the pressure p or the volume flow V in the two hydraulic cylinders 13, 14 is plotted over the time t. For example, the upper diagram illustrates the course at the sensor 20 of the front-side hydraulic cylinder 13, and the lower diagram illustrates the course at the sensor 20 of the rear-side hydraulic cylinder 14 during the engaging mode. At time t1, lifting columns 16, 17 located in the front in the working direction a and in the rear in the working direction a are retracted. The pressure p1 in (or the volume flow V1 from or to) the hydraulic cylinders 13, 14 located in the front and in the rear of the side plate 12 in the working direction a remains constant. At time t2, there is a pressure increase or a change in volume flow at the hydraulic cylinders 13 located at the front to the values p2/V2. These measurements on the sensors 20 are evaluated by the control unit such that a ground contact of the side plate 12 is detected in the region located in the front in the working direction a. In response thereto, the lowering is stopped through the front-side lifting column 16. The pressure or the volume flow returns to the initial value p1/V1, as, for instance, shown at time t3. Due to the further lowering of the machine frame 3, there is, at time t4, a ground contact in the region of the side plate 12 located in the rear in the working direction a, which is detected through the pressure increase or the change in volume flow to the values $_{p2/V2}$ at the sensor 20 of the rear-side hydraulic cylinder 14 of the side plate 12. If then the lowering of the machine frame 3 is stopped also in the rear in the working direction a, the values will return to p1/V1, as shown at time t5, for example. If, however, a further lowering is carried out through the lifting columns 16, 17 located in the front and in the rear, other curves may result.

Figure 9:
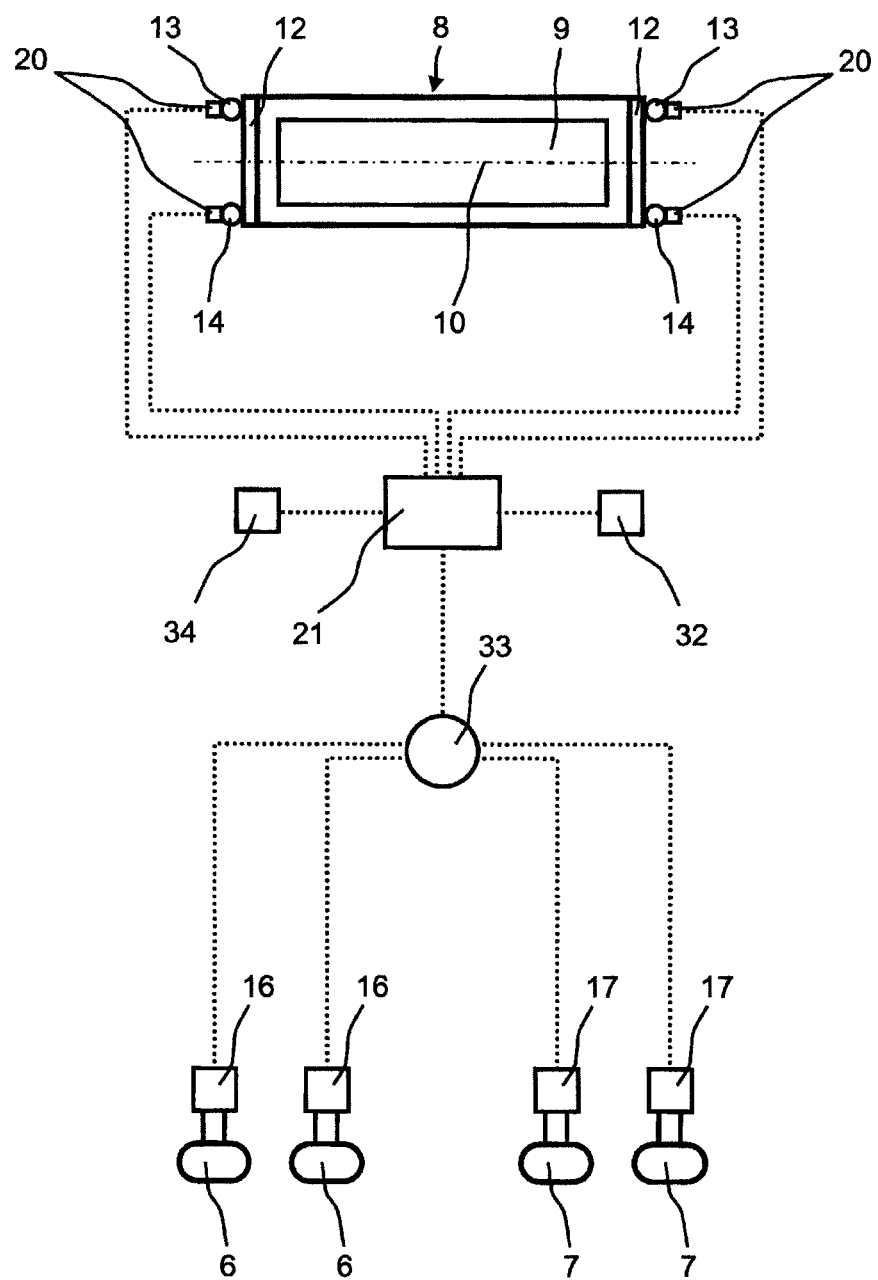
FIG. 9 is a diagram of the connections of the control unit.

The described measurements or respectively detection may assume important functions not only in the engaging mode but also in a compensation mode of the ground milling machine 1. The compensation mode follows the engaging mode and refers to the operation of the ground milling machine 1 over the first meters of the milling process and beyond in the working direction a. When the ground milling machine 1 moves into a newly created milling track with the rear-side undercarriage 7, the side plate 12 contacts the ground 11 in the region located in the rear in the working direction a. This contact can also be detected at the sensors 20, as shown in FIG. 8. The force acting from the ground on the side plate 12 is measured or detected at the sensors 20. In response thereto, the control unit 21 (see also FIG. 9) adjusts the rear-side lifting column 17 upwardly by the amount of the milling depth, so that the ground milling machine 1 or the machine frame 3 thereof is again aligned in parallel to the ground 11, and the milling process can be continued without problems.

Alternatively, to the hydraulic variant further described in FIGS. 7 and 8, the present invention, in particular, also comprises an electric variant. The principle for determining the ground contact is the same. An electric motor is provided for height adjustment of the side plate via an electric energy supply. The side plate is moved by the ground by the ground contact, which movement is transmitted to the respective actuator. Said actuator then acts as a generator and outputs a signal of an electric operating parameter comparable to FIG. 8, which is detected by a suitable sensor 20 and transmitted to the control device.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A method for positioning a milling drum box of a ground milling machine, arranged on a machine frame, relative to the ground, comprising the steps:
    a) detecting a presence or absence of a ground contact in a region located in a front in a working direction (a) and/or a region located in a rear in the working direction (a) of at least one side plate of the milling drum box of the ground milling machine by measuring a change of an operating parameter of at least one actuator that is configured for height adjustment of the side plate, and
    b) controlling a lifting and/or a lowering of the machine frame depending on the detected presence or absence of a ground contact.

2. The method according to claim 1, wherein in an engaging mode, the lowering of the machine frame via lifting columns of the machine frame located in the front in the working direction (a) is stopped when ground contact is detected in the region of the side plate located in the front in the working direction (a), and/or the lowering of the machine frame via lifting columns located in the rear in the working direction (a) of the machine frame is stopped when ground contact is detected in the region of the side plate located in the rear in the working direction (a).

3. The method according to claim 1, wherein in a transverse inclination mode, the lowering of the machine frame through lifting columns of the machine frame located in the front and in the rear in the working direction (a) is stopped when ground contact is detected via the side plate positioned on this machine side and/or the lowering of the machine frame via lifting columns of the machine frame arranged on the other side of the machine is stopped when ground contact is detected via the side plate positioned on this other side.

4. The method according to claim 1, wherein the lowering of the machine frame through lifting columns located in the front and in the rear in the working direction (a) takes place in a uniform manner as long as ground contact is not detected or once ground contact was detected in both the region of the side plate located in the front in the working direction (a) as well as in the region of the side plate located in the rear in the working direction (a), and/or that the lowering of the machine frame via lifting columns located on the right or on the left in the working direction (a) takes place in a uniform manner as long as a ground contact is not detected or once ground contact was detected on both the side located on the left in the working direction (a) as well as on the side located on the right in the working direction (a).

5. The method according to claim 1, wherein the method steps are carried out in a manner which is coordinated by a control unit such that the ground milling machine is lowered to a predetermined milling depth and/or transverse inclination, wherein the machine frame of the ground milling machine is positioned in parallel to the ground.

6. The method according to claim 1, wherein after reaching a predetermined milling depth in a compensation mode, a force directed to the region located in the rear of the side plate in the working direction (a) and away from the ground is measured and lifting of the machine frame is performed through lifting columns of the machine frame located in the rear in the working direction (a) if the force measured in the region located in the rear in the working direction (a) exceeds a predetermined threshold value.

7. The method according to claim 1,
wherein measuring of a change of an operating parameter of the at least one actuator comprises measuring an operating parameter of an actuator driven by electric or hydraulic energy.

8. The method according to claim 1,
wherein the detection of the presence or absence of a ground contact and/or the measurement of the force is effected by measuring changes of at least one operating parameter of a sensor arranged in a drive train of the actuator for height adjustment of the side plate.

9. The method according to claim 8,
wherein the method comprises at least one of the following method steps:
a) detecting pressure changes at and/or volume flow changes to or from a hydraulic cylinder located in the front or in the rear in the working direction (a), via which the side plate of the milling drum box of the ground milling machine is movable relative to the machine frame;
b) detecting current and/or voltage signals of an electric drive as a part of an electrical linear actuator with a screw drive located in the front in the working direction (a) or in the rear in the working direction (a), via which the side plate of the milling drum box of the ground milling machine is movable relative to the machine frame.

10. The method according to claim 1,
wherein the ground milling machine comprises a road milling machine, a recycler or a stabilizer.

11. A ground milling machine, comprising:
a) a machine frame,
b) at least one undercarriage located in a front in a working direction (a) and at least one undercarriage located in a rear in the working direction (a), which are connected via at least one front lifting column and at least one rear lifting column to the machine frame and carry the latter,
c) a milling drum box arranged on the machine frame which includes a housing and at least one side plate being height-adjustable through at least one actuator,
d) a milling drum rotatably supported in the milling drum box, and
e) a control device,
wherein at least one sensor is provided, which is adapted for detecting changes of at least one operating parameter within a drive train of an actuator arranged in the region of the side plate located in the front in the working direction (a), and/or in the region of the side plate located in the rear in the working direction (a) for height adjustment of the side plate, in order to detect a ground contact of the side plate, and in that the control unit is configured in such a way that it controls a lifting and/or a lowering of the machine frame depending on the detected presence or absence of a ground contact.

12. The ground milling machine according to claim 11,
wherein the side plate comprises an actuator located in the front in the working direction (a) and an actuator located in the rear in the working direction (a), and that in each case one sensor is provided for determining a presence or absence of a ground contact in both the drive train of the actuator located in the front in the working direction (a) as well as in the drive train of the actuator located in the rear in the working direction (a).

13. The ground milling machine according to claim 11,
wherein the control unit is configured in such a way that in an engaging mode it stops a lowering of the machine frame via the front lifting columns if the sensor detects a ground contact in the region of the side plate located in the front in the working direction (a), and/or stops a lowering of the machine frame via the rear lifting columns if the sensor detects a ground contact in the region of the side plate located in the rear in the working direction (a), and/or that the control unit is configured in such a way that, in a transverse inclination mode, it stops the lowering of the machine frame through lifting columns of the machine frame positioned on one machine side in the front and in the rear in the working direction (a) if a ground contact is detected via the side plate positioned on this side of the machine, and/or it stops the lowering of the machine frame through lifting columns of the machine frame arranged on the other machine side in the working direction (a) in the front and the rear in the working direction (a) if a ground contact is detected via the side plate positioned on this other side.

14. The ground milling machine according to claim 11,
wherein at least in the region of the side plate located in the rear in the working direction (a), the sensor is configured in such a way that it can determine an operating parameter varying in the drive train of the actuator with a force directed away from the ground and acting on the side plate, and that the control unit is configured in such a way that in a compensation mode it performs a lifting of the machine frame through the lifting columns of the machine frame located in the rear in the working direction (a) if the force or the operating parameter correlated with the force exceeds a predetermined threshold value.

15. The ground milling machine according to claim 11,
wherein the side plate is supported so as to be movable with respect to its height relative to the machine frame and/or milling drum box by an actuator located in the front in the working direction (a) and an actuator located in the rear in the working direction (a), and that the sensors detect the presence or absence of a ground contact in the region of the side plate located in the front and/or the rear in the working direction (a), and/or the force directed away from the ground and acting on the side plate by measurement of:
a) a change in pressure on the hydraulic cylinders and/or a change in volume flow to or from the hydraulic cylinders, or
b) a change in a current and/or a voltage of an electric drive, in particular as part of an electric linear actuator with a screw drive, in particular located in the front in the working direction (a) or in the rear in the working direction (a), by means of which the side plate of the milling drum box of the ground milling machine is movable relative to the machine frame.

16. The ground milling machine according to claim 11,
wherein the sensors include measurement orifices that are arranged on the piston side on the hydraulic cylinders of the side plate located in the front or in the rear in the working direction (a) in the hydraulic lines leading to the piston side of the hydraulic cylinders.

17. The ground milling machine according to claim 11, wherein the milling drum box is configured as a replaceable module, wherein the sensors are in particular arranged on the module and are replaceable with the module.

18. The ground milling machine according to claim 11, wherein the control unit is configured such that during a lifting and/or a lowering of the machine frame, in the engaging mode, no manual control of the ground milling machine is possible except for an emergency-stop command.

19. The ground milling machine according to claim 11, wherein the ground milling machine comprises a road milling machine, a recycler or a stabilizer.

\* \* \* \* \*